3,103,467
ANTISEPTIC DETERGENT COMPOSITIONS AND METHOD OF CONTROLLING BACTERIAL GROWTH
David J. Beaver, Richmond Heights, and Paul J. Stoffel, St. Louis, Mo., assignors to Monsanto Chemical Company, St. Louis, Mo., a corporation of Delaware
No Drawing. Filed Dec. 21, 1959, Ser. No. 860,687
20 Claims. (Cl. 167—58)

This invention relates to new and useful antiseptic compositions containing halogen-substituted thiocarbanilides and to certain new unsymmetrical halogen-substituted thiocarbanilides.

The active ingredients of the antiseptic compositions of this invention may be represented by the general formula

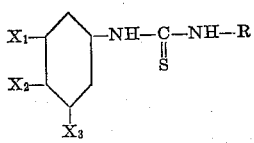

wherein $X_1$, $X_2$ and $X_3$ are halogen or hydrogen and wherein at least two of said $X_1$, $X_2$ and $X_3$ substituents are halogen, where R is a halogen-substituted aromatic hydrocarbon radical free of substituents ortho to the —NH— group. Examples of R are 3-chlorophenyl; 4-chlorophenyl; 3-bromophenyl; 4-bromophenyl; 3,4-dichlorophenyl; 3,4-dibromophenyl; 3,5-dichlorophenyl; 3,5-dibromophenyl; 3,4,5-trichlorophenyl; 3,4,5-tribromophenyl; 3-chloro-4-methylphenyl; 4-chloro-3-methylphenyl; 4-bromo-3-methylphenyl; 3,5-dichloro-4-methylphenyl; 4-chloro-3,5-dimethylphenyl; 3-chloro-4-ethylphenyl; 3-chloro-4-isopropylphenyl; 3-chloro-4-n-butylphenyl; 3-chloro-4-tert. butylphenyl; the various chlorobiphenylyls such as 3-chloro-4-biphenylyl and 3-chloro-4-(4-chlorophenyl) phenyl, and the like. While R may be any mono- or poly-halogen substituted aromatic hydrocarbon radical free of substituents ortho to the —NH— group, it is preferable that R be the phenyl radical containing not more than three halogen substituents. Of this preferred group the unsymmetrical halogen-substituted thiocarbanilides (i.e. those of the structure

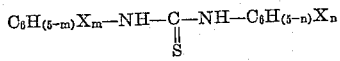

wherein $m$ is a whole number from 2 to 3, wherein $n$ is a whole number from 1 to 3, wherein the sum of $m$ and $n$ is in the range of 3 to 5, wherein X is halogen, and wherein the respective phenyl nuclei are free of substituents ortho to the —NH— group) are new compounds and are particularly outstanding in the control of bacterial growth on the surfaces containing such growth. In the above structure said phenyl nuclei are conventionally represented as $C_6H_5$. Of the unsymmetrical halogen-substituted thiocarbanilides optimum control of bacterial growth is obtained with the following 3,4,4'-trichlorothiocarbanilide
3,3',4-trichlorothiocarbanilide
3,4-dichloro-3'-bromothiocarbanilide
3,4-dichloro-4'-bromothiocarbanilide By "halogen" as employed in this application and appended claims is meant those halogen atoms having an atomic weight in the range of 35 to 80, e.g. chlorine and bromine.

As illustrative of the antiseptic agents of this invention and the preparation thereof is the following:

EXAMPLE I

To a suitable reaction vessel equipped with a thermometer, agitator and reflux condenser and containing 2.5 parts by weight (substantially 0.02 mol) of p-chloroaniline in approximately 28 parts by weight of ethanol is added 4.1 parts by weight (substantially 0.02 mol) of 3,4-dichlorophenylisothiocyanate and the mix refluxed for about one hour. The solution is cooled, the crystallized product is filtered off and washed with diethyl ether. The dried product is a white solid which on recrystallization from ethanol gives white granules of 3,4,4'-trichlorothiocarbanilide, M.P. 154.2–154.9° C.

Employing the above procedure but replacing 3,4-dichlorophenylisothiocyanate with 3,5-dichlorophenylisothiocyanate there is obtained white solid 4,3',5'-trichlorothiocarbanilide.

EXAMPLE II

To a suitable reaction vessel is added and intimately mixed 3.3 parts by weight of 3,4-dichloroaniline, approximately 25 parts by weight of ethanol and approximately 4.1 parts by weight of 3,4-dichlorophenylisothiocyanate and the solution refluxed for about 1 hour. The solution is cooled, the crystallized product is filtered off and washed with diethyl ether. The dried product is a white solid which on recrystallization from ethanol gives white granules of 3,3',4,4'-tetrachlorothiocarbanilide, M.P. 162.6–163.5° C.

EXAMPLE III

To a suitable reaction vessel is added and intimately mixed 2.5 parts by weight of m-chloroaniline, approximately 30 parts by weight of ethanol, and approximately 4.1 parts by weight of 3,4-dichlorophenylisothiocyanate and the solution refluxed for about 1 hour. The solution is cooled; the crystallized product filtered off and washed with diethyl ether. The dried product is a white solid which on recrystallization from ethanol gives white granules of 3,3',4-trichlorothiocarbanilide, M.P. 119.5–120.5° C.

Replacing 3,4-dichlorophenylisothiocyanate in the above example with an equimolar amount of 3,4-dibromoisothiocyanate there is obtained 3,4-dibromoisothiocyanate there is obtained 3,4-dibromo-3'-chlorothiocarbanilide as a white solid.

EXAMPLE IV

To a suitable reaction vessel is added and intimately mixed 3.4 parts by weight of m-bromoaniline and approximately 4.1 parts by weight of 3,4-dichlorophenylisothiocyanate and the mass heated at 90° C. for about 3 hours. The product so obtained is dissolved in boiling p-xylene, cooled and filtered. The dried collected residue is 3,4-dichloro-3'-bromothiocarbanilide, a white flaky solid melting at 107.5–108.3° C.

Employing the above procedure but replacing 3,4-dichlorophenylisothiocyanate with a chemically equivalent amount of 3,4-dibromophenylisothiocyanate there is obtained as a white solid 3,3',4-tribromothiocarbanilide melting at 125.0–126.1° C.

Other halogen substituted thiocarbanilide antiseptic agents prepared in accordance with the foregoing procedures employing the followed reactants are as follows:

| Halogenated aniline | Isothiocyanate | Halogenated thiocarbanilide |
|---|---|---|
| 3,5-dichloroaniline | 3,4-dichlorophenylisothiocyanate | 3,3',4,5'-tetrachlorothiocarbanilide. |
| 3,4,5-trichloroaniline | ------do------ | 3,3',4,4',5-pentachlorothiocarbanilide. |
| 3-chloro-p-toluidine | ------do------ | 3,3',4-trichloro-4'-methylthiocarbanilide. |
| 4-chloro-m-toluidine | ------do------ | 3,4,4'-trichloro-3'-methylthiocarbanilide. |
| 3-chloro-4-isoamyl aniline | ------do------ | 3,3',4-trichloro-4'-isoamylthiocarbanilide. |
| 3-chloro-4-phenyl aniline | ------do------ | 3,3',4-trichloro-4'-phenylthiocarbanilide. |
| 3,5-dichloroaniline | 3-chlorophenylisothiocyanate | 3,3',5-trichlorothiocarbanilide. |
| 3,4-dibromoaniline | 4-chlorophenylisothiocyanate | 3,4-dibromo-4'-chlorothiocarbanilide. |
| Do | 3,4-dichlorophenylisothiocyanate | 3,4-dibromo-3',4'-dichlorothiocarbanilide. |
| 3,5-dibromoaniline | 4-chlorophenylisothiocyanate | 3,5-dibromo-4'-chlorothiocarbanilide. |
| 3,4,5-tribromoaniline | ------do------ | 3,4,5-tribromo-4'-chlorothiocarbanilide. |
| 3,4,5-trichloroaniline | ------do------ | 3,4,4',5-tetrachlorothiocarbanilide. |

According to one aspect of this invention, organic cleansing detergents having an organic anionic surface-active detergent base (or mixture of such organic anionic compounds as the detergent base) or organic non-ionic surface-active detergent base (or mixture of such non-ionic compounds as the detergent base) or combination of an anionic and non-ionic organic surface-active agents as the detergent base, are rendered highly antiseptic by incorporating therein the aforedescribed halogen-substituted thiocarbanilides. While organic detergents (i.e. the anionic and non-ionic surface-active detergents characterized by having a molecule which carries a hydrophobic tail and a hydrophilic head, wherein the hydrophilic head points toward water while the hydrophobic tail points away from water) are capable of washing large quantities of bacteria and other micro-organism off surfaces, relatively appreciable numbers of such organisms remain on the surface which continue to multiply. In order to remove this residue it has usually been necessary to use a separate treatment with some disinfectant agent. A combined single step procedure would be most desirable. However, the problem is not simple to solve on a commercial scale in an economical manner inasmuch as the organic detergents destroy the bactericidal efficacy of nearly all disinfectants. In order to be of universal application the bacteriostat must not lose its activity in the presence of the organic detergent, it should be active at low concentrations, it should be non-toxic to animals, non-irritating to the skin, and have some affinity for the skin so that after rinsing a small amount will remain and exert a bacteriostatic effect. The halogen-substituted thiocarbanilides but particularly the unsymmetrical halogen substituted thiocarbanilides aforedescribed when admixed with an organic detergent, such as an anionic surface-active detergent or non-ionic surface-active detergent or combination thereof, satisfy all of these requirements. In order to illustrate this embodiment of this invention several halogen-substituted thiocarbanilides of this invention were incorporated in an alkali metal fatty acid soap, specifically an "Ivory" brand neutral high grade white toilet soap, a mixture of alkali metal salts of fatty acids whose fatty acid content analyzes

| | Percent |
|---|---|
| Oleic and linoleic acid | About 46 |
| Stearic acid | About 14 |
| Palmitic acid | About 30 |
| Lower fatty acids (myristic, lauric, etc.) | About 10 |

The respective compounds which are tabulated below were incorporated in the said "Ivory" brand toilet soap in a weight ratio of one part to 50 parts soap. Aliquots of each were added to a Sabouraud's dextrose agar medium so as to give concentrations in parts per million as set forth below of the respective compounds in the agar. The agar in each case was then poured into a Petri dish, allowed to harden and then inoculated with a standard culture of *Micrococcus pyogenes* var. *aureus* (*Staphylococcus aureus*) of standard resistance. The incubation in each instance was made at 37° C. for 48 hours.

*Table I*

| Compound/concentration, p.p.m. | 10 | 1 | 0.1 |
|---|---|---|---|
| 3,3',4-tribromo thiocarbanilide | None | None | Heavy. |
| 3,3',4-trichloro thiocarbanilide | None | None | None. |
| 3,4-dichloro-3'-bromo thiocarbanilide | None | None | None. |
| 3,4,4'-trichloro thiocarbanilide | None | None | None. |
| 3,3',4,4'-tetrachloro thiocarbanilide | None | Heavy | Heavy. |

Replacing the foregoing "Ivory" brand soap with an equal weight of a "Lux" brand solid neutral white toilet soap (a mixture of alkali metal salts of fatty acids whose fatty acid content analyzes about 45% oleic and linoleic acid, about 30% palmitic acid, about 10% stearic acid, and about 15% lower fatty acids) the same results are obtained. The same results are also obtained using instead of a solid soap a liquid soap, such as that having a 40% alkali metal fatty acid soap content prepared from an alkali metal compound and a mixture of fatty acids obtained from a mixture of 75% coconut oil and 25% olive oil. Other alkali metal fatty acid soaps may also be used, e.g. the usual alkali metal (sodium and/or potassium) soaps of higher fatty acids of vegetable or animal origin, such as stearic, lauric, palmitic, oleic, linoleic, ricinoleic, and the like, or the mixtures thereof obtained from tallow, lard, coconut oil, palm oil, castor oil, olive oil, hydrogenated cottonseed oil, and the like.

The organic anionic detergents of this invention include in addition to the preferred alkali metal fatty acid soaps the well known surface-active alkali metal sulfonates and sulfates, which may be employed as the sole detergent base or in admixture with the alkali metal fatty acid soaps (e.g. one part of the fatty acid soap to 0.5 to 2 parts by weight of the surface-active alkali metal sulfonate or sulfate or mixtures thereof) as the detergent base. A preferred group of this class is the long chain alkyl aryl sulfonates, i.e. those wherein the alkyl radical is straight or branched in structure and contains from 8 to 22 carbon atoms, but preferably 10 to 16 carbon atoms, examples of which being octyl, decyl, dodecyl, keryl, pentadecyl, hexadecyl, octadecyl, mixed long chain alkyls derived from long chain fatty materials such as the lauryl radical, cracked paraffin wax olefins, polymers of lower monoolefins such as propylene tetramer and the like, and wherein the aryl radical is derived from benzene, toluene, xylene, phenol, the cresols, naphthalene, and the like. Specific examples of such comprise sodium decyl benzene sulfonate, sodium dodecyl benzene sulfonate, sodium lauryl benzene sulfonate and sodium hexadecyl benzene sulfonate.

Other sulfonate surface-active agents are contemplated also, e.g. the long chain alkyl sulfonates such as sodium hexadecane sulfonate and sodium octadecane sulfonate.

The well known sulfate detergents having 12 to 26 carbon atoms and particularly those having an acyl radical of about 8 to 22 carbon atoms may be employed as anionic detergent bases in accordance with this invention. Such detergents include the sulfuric acid esters of polyhydric alcohols incompletely esterified with fatty acids, e.g. sodium coconut oil mono-glyceride monosulfate, sodium tallow diglyceride monosulfate, the pure and mixed higher alkyl sulfates such as sodium lauryl sulfate and sodium cetyl sulfate. Further descriptive information regarding these compounds may be found in U.S. Patent No. 2,264,737.

Additional anionic surface-active sulfonates and sulfates contemplated by this invention include the sulfated and sulfonated alkyl acid amides such as Igepon T ($C_{17}H_{33}CO.NHCH_2CH_2SO_3Na$); the sulfated and sulfonated esters such as Igepon AP ($RCOOCH_2SO_3Na$ where R is an alkyl radical containing from 12 to 18 carbon atoms), sodium salt of the bisulfate of a dialkyl dicarboxylate, sodium salt of the sulfonic acid derivative of a dialkyl dicarboxylate, a sodium salt of sodium sulfosuccinic acid such as $NaOOCCH_2CH(SO_3Na)CONCH_{18}H_{37}$, and the like.

In addition to the anionic surface-active agents the non-ionic surface-active agents containing a halogen-substituted thiocarbanilide of this invention provides antiseptic compositions. The non-ionic surface-active agents contemplated are viscous liquid to wax-like water-soluble surface-active substances containing a polyglycol ether group of the structure

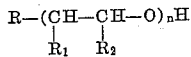

wherein $R_1$ and $R_2$ are hydrogen or short chain alkyl, where $n$ is an integer greater than 3, where R is a residue of a compound of a monomeric organic compound having an active hydrogen, e.g. alcohols, phenols, amides, primary amines, secondary amines, carboxylic acids, etc. These non-ionic detergents are well known (note U.S. 1,970,578 and U.S. 2,213,477) and may be typified by the polyalkylene oxide derivatives (i.e. polyethylene oxide, polypropylene oxide, polybutylene oxide) of water-insoluble higher fatty acids, such as lauric, oleic, palmitic, and stearic acid and the like of mixtures thereof, such as the mixtures of fatty acids, obtained from animal and vegetable fats and oils or by oxidation of petroleum fractions such as paraffin wax. They may also be exemplified by the polyalkylene oxide derivatives of such water-insoluble organic hydroxy compounds as higher aliphatic alcohols (i.e. the alcohols corresponding to the fatty acids specified above or mixtures thereof), oil or phenols, particularly alkyl phenols containing at least six alkyl carbon atoms such as isooctyl-, di-tertiary butyl-, triisopropyl-, nonyl-, dodecyl-, octadecyl-phenols or naphthols, or of higher alkyl alcohols, such as benzyl alcohol, cinnamyl alcohol. They may also be exemplified by the polyalkylene oxide derivatives of such amines as stearyl, lauryl, dicyclohexyl, dibutyl amine and the like. A particularly useful non-ionic detergent is that obtained by condensing one mol of tall oil with 5 to 15 mols of ethylene oxide.

The halogen-substituted thiocarbanilides described herein are useful in preparing antiseptic shampoos and as illustrative thereof is the following composition:

| | Parts by weight |
|---|---|
| Triethanol lauryl sulfate | 60 |
| Methyl cellulose | 2 |
| Propylene glycol | 4 |
| Potassium stearate | 6 |
| Water | 130 |
| 3,4,4'-trichloro thiocarbanilide | 1 |

Other organic base detergent compositions for cleansing purposes containing mixtures of detergents which display outstanding antiseptic properties may be exemplified by the following:

| | Parts by weight |
|---|---|
| Tall oil-ethylene oxide condensation product (1 mol tall oil–11 mols ethylene oxide) | 20 |
| Sodium dodecyl benzene sulfonate | 80 |
| Carboxy methyl cellulose, sodium | 4 |
| Sodium tripolyphosphate | 80 |
| Sodium sulfate | 200 |
| 3,4,4'-trichlorothiocarbanilide | 1 |

The halogen-substituted thiocarbanilides are useful in astringent preparations such as those containing aluminum chloride as the base. An example of such is

| | Parts by weight |
|---|---|
| Aluminum chloride | 20 |
| 3,4,4'-trichloro thiocarbanilide | 10 |
| Water | 70 |

The halogen-substituted thiocarbanilides of this invention are employed in cosmetic compositions ordinarily used to beautify, cleanse or protect the skin in any amount sufficient to control the growth of or to kill bacteria, specifically *Micrococcus pyogenes* var. *aureus*, normally present on the skin. Relatively small amounts of the halogen-substituted thiocarbanilides of this invention in cosmetics, particularly those having as a base an anionic or non-ionic organic detergent or combination of said detergents, have been found to yield effective antiseptic compositions. With respect to cosmetics having an anionic or non-ionic detergent base amounts as low as 0.1% to 1% by weight based upon the total weight of the organic detergent may be employed. It is preferred in detergent cleansing compositions having an anionic detergent base or non-ionic detergent base to employ these halogen-substituted thiocarbanilides in amounts in the order of 1% to 3% by weight based on the total weight of detergent. While larger amounts with respect to the detergent base may be employed, the upper limit will be determined by practical considerations as well as by the particular cosmetic composition involved, i.e. whether the composition is to be used for cleansing purposes in the sense of a toilet soap or as a shaving cream or as a shampoo, etc. In cleansing compositions in the sense of a toilet soap containing an anionic organic detergent base (e.g. an alkali metal fatty acid detergent soap alone or in admixture with another anionic organic detergent such as the aforedescribed sodium alkyl aryl sulfonate detergents) or non-ionic detergent base, the amount of halogen-substituted thiocarbanilides of this invention, ordinarily will not exceed 10% by weight of the detergent base. However, in shampoos, shaving creams, and the like, employing an anionic detergent organic base or non-ionic detergent base the amounts of halogen-substituted thiocarbanilides of this invention will be present to the extent of 50% by weight based on the total detergent base content. Various colors, antioxidants, perfumes, water-softeners, salts such as silicates, chlorides, carbonates, phosphates and sulfates of alkali metals and like builders, sodium carboxy methyl cellulose, the low molecular weight alcohols such as methanol, ethanol, isopropanol, ethylene glycol, and the like, may be included where desirable.

While this invention has been described with respect to certain embodiments it is to be understood that it is not so limited in that variations and modifications thereof obvious to those skilled in the art may be made without departing from the spirit or scope of this invention.

This application is a continuation-in-part of copending application Serial No. 696,328, filed November 14, 1957, now abandoned, which is in turn a continuation-in-part of application Serial No. 465,431, filed October 28, 1954, and now abandoned.

What is claimed is:

1. An antiseptic composition comprising an organic detergent selected from the group consisting of anionic detergents, non-ionic detergents and mixtures thereof and an antiseptic amount of a halogen-substituted thiocarbanilide of the structure

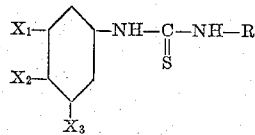

wherein $X_1$, $X_2$ and $X_3$ are selected from the group consisting of halogen and hydrogen, wherein at least two of said substituents $X_1$, $X_2$ and $X_3$ are halogen, and wherein R is a halogen-substituted aromatic hydrocarbon radical free of substituents ortho to the —NH— group, the halogen substituents of said halogen-substituted thiocarbanilide having an atomic weight in the range of 35 to 80.

2. The composition of claim 1 wherein the thiocarbanilide is an unsymmetrical halogen-substituted thiocarbanilide of the structure

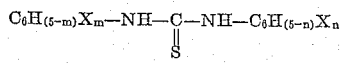

wherein $m$ is a whole number from 2 to 3, wherein $n$ is a whole number from 1 to 3, wherein the sum of $m$ and $n$ is in the range of 3 to 5, and wherein X is a halogen atom having an atomic weight in the range of 35 to 80, the respective phenyl nuclei of said thiocarbanilide being free of substituents ortho to the respective —NH— groups.

3. An antiseptic detergent composition comprising an organic anionic detergent and 0.1 to 10% by weight based on the detergent of a halogen-substituted thiocarbanilide of the structure

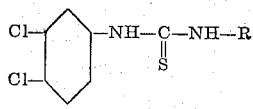

wherein R is the mono-halogen substituted phenyl radical $C_6H_4X$ free of ortho substituents and wherein X is chlorine.

4. An antiseptic detergent composition as defined in claim 3 wherein X is bromine.

5. The composition of claim 3 wherein the organic anionic detergent is an alkali metal fatty acid soap.

6. The composition of claim 5 wherein the thiocarbanilide is 3,4,4'-trichlorothiocarbanilide.

7. The composition of claim 5 wherein the thiocarbanilide is 3,3',4-trichlorothiocarbanilide.

8. The composition of claim 5 wherein the thiocarbanilide is 3,4-dichloro-3'-bromothiocarbanilide.

9. An antiseptic composition comprising an organic anionic detergent and 0.1 to 50% by weight based on the detergent of an unsymmetrical halogen-substituted thiocarbanilide of the structure

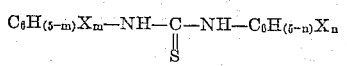

wherein $m$ is a whole number from 2 to 3, wherein $n$ is a whole number from 1 to 3, wherein the sum of $m$ and $n$ is in the range of 3 to 5, and wherein X is a halogen atom having an atomic weight in the range of 35 to 80, the respective phenyl nuclei of said thiocarbanilide being free of substituents ortho to the respective —NH— groups.

10. The composition of claim 9 wherein the organic anionic detergent is an alkali metal fatty acid soap.

11. The method of controlling bacterial growth which comprises treating a surface containing bacteria with the composition of claim 1.

12. The method of controlling bacterial growth which comprises treating a surface containing bacteria with the composition of claim 2.

13. The method of controlling bacterial growth which comprises treating skin surface with the composition of claim 3.

14. The method of controlling *Staphylococcus aureus* which comprises treating skin surface containing same with the composition of claim 4.

15. The method of controlling bacterial growth which comprises treating a surface containing bacteria with a compound of the structure

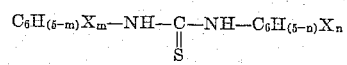

wherein $m$ is a whole number from 2 to 3, wherein $n$ is a whole number from 1 to 3, wherein the sum of $m$ and $n$ is in the range of 3 to 5, and wherein X is a halogen atom having an atomic weight in the range of 35 to 80, the respective phenyl nuclei of said thiocarbanilide being free of substituents ortho to the respective —NH— groups.

16. The method of controlling bacterial growth which comprises treating a surface containing bacteria with a compound of the structure

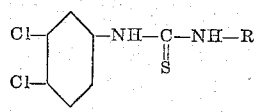

wherein R is the mono-halogen-substituted phenyl radical $C_6H_4X$ free of ortho substituents and wherein X is chlorine.

17. The method of controlling bacterial growth as defined in claim 16 wherein X is bromine.

18. The method of controlling bacterial growth which comprises treating a surface containing bacteria with 3,4,4'-trichlorothiocarbanilide.

19. The method of controlling bacterial growth which comprises treating a surface containing bacteria with 3,3',4-trichlorothiocarbanilide.

20. The method of controlling bacterial growth which comprises treating a surface containing bacteria with 3,4-dichloro-3'-bromothiocarbanilide.

References Cited in the file of this patent

UNITED STATES PATENTS

| | | |
|---|---|---|
| 2,155,328 | Paquin | Apr. 18, 1939 |
| 2,655,534 | Searle | Oct. 13, 1953 |
| 2,818,390 | Beaver | Dec. 31, 1957 |
| 2,846,398 | Beaver | Aug. 5, 1958 |
| 2,867,659 | Model | Jan. 6, 1959 |

OTHER REFERENCES

Dyson: J. Chem. Soc., 1927, pp. 436–45.
Dyson: J. Chem. Soc., 1934, pp. 174–7.
Hamalainen, JACS, vol. 71, 1949, pp. 743–4.
Raiford: JACS, vol. 56, 1934, pp. 680–681.
Thompson: Chem. Abs., ACS, vol. 41, 1947, 3902–12 (see 3909d).